W. E. HOSCH, DEC'D.
A. M. HOSCH, ADMINISTRATRIX.
CALCULATING APPARATUS.
APPLICATION FILED APR. 24, 1916.
1,327,044.
Patented Jan. 6, 1920.
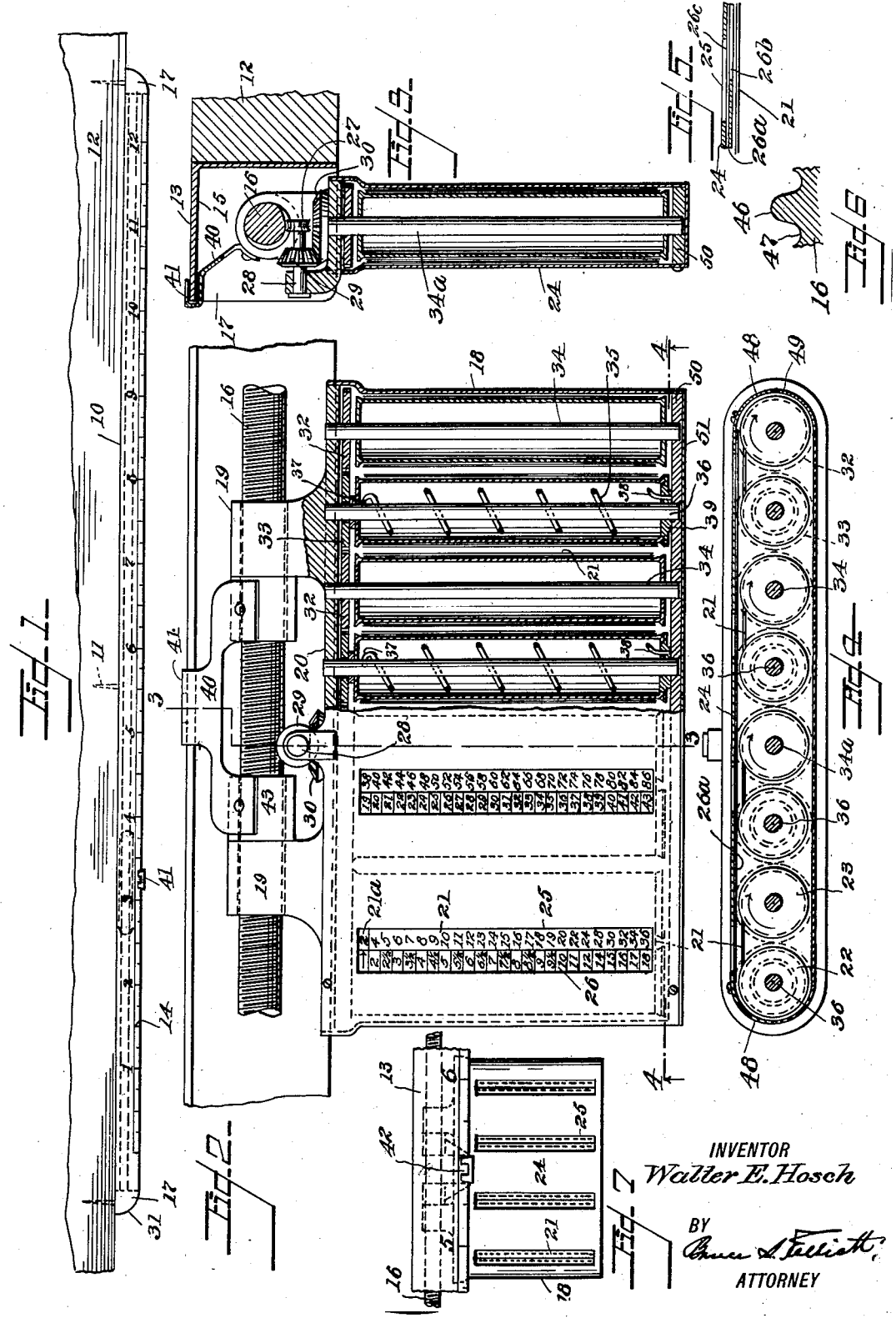
INVENTOR
Walter E. Hosch
BY
ATTORNEY

UNITED STATES PATENT OFFICE.

WALTER E. HOSCH, OF ST. LOUIS, MISSOURI; ANNIE MAE HOSCH, ADMINISTRATRIX OF SAID WALTER E. HOSCH, DECEASED, ASSIGNOR TO THE MEASUREGRAPH COMPANY, OF ST. LOUIS, MISSOURI, A CORPORATION OF MISSOURI.

CALCULATING APPARATUS.

1,327,044.   Specification of Letters Patent.   Patented Jan. 6, 1920.

Application filed April 24, 1916. Serial No. 93,122.

*To all whom it may concern:*

Be it known that I, WALTER E. HOSCH, a citizen of the United States, residing in the city of St. Louis and State of Missouri, have invented new and useful Improvements in Calculating Apparatus, of which the following is a specification.

This invention relates to a calculating machine which may be used for many different purposes, but which is intended to be especially useful as an accessory for salesmen or saleswomen in shops, to compute the value of goods which they sell. The general object of the invention is to produce a machine of this class which is very compact in structure, but which will have, nevertheless, a very wide range in the number of computations which it can make. One of the features of the invention contributing to the desired result, resides in a construction which enables a sliding movement of a part of the device to drive the computing mechanism. For convenience the device may be attached to the edge of a counter, and one of the objects of the invention is to construct the parts so as to enable the indicated computations to be readily observed without the device obstructing the salesman's movements about the counter. In the embodiment of the invention about to be described the results of the calculations are indicated upon a tabulated member, and one of the objects of the invention is to provide a construction which will enable this tabulated member to have a relatively large area though occupying a comparatively small space. Further objects of the invention will appear hereinafter.

In the drawing which illustrates an embodiment of my invention,

Figure 1 is a plan upon a small scale indicating the general construction and arrangement of the device when constituting a salesman's accessory.

Fig. 2 is a front elevation and partial section of the device upon an enlarged scale.

Fig. 3 is a longitudinal vertical section through the device taken about on the line 3—3 of Fig. 2.

Fig. 4 is a horizontal section taken about on the line 4—4 of Fig. 2, and looking upwardly, certain parts being omitted.

Fig. 5 is a section taken through the wall of the case and illustrating how the figures of the tabulated member are made visible from the exterior of the device.

Fig. 6 is a cross section upon an enlarged scale showing a short portion of the side of a part of the device which coöperates with other parts to drive the tabulated member when the machine is in use.

Fig. 7 is a plan upon a small scale indicating how the case of the machine may be swung up to enable the calculations to be readily seen by the salesman.

Referring more particularly to the parts, the device comprises a scale 10, which is in the form of an angle bar, provided at suitable points with means such as spurs 11 for attaching the scale in a fixed position upon a horizontal support, such as a counter 12, over which goods are sold. The upper face 13 of the scale is provided on its outer edge with divisions 14 bearing consecutive numbers, in the present instance running from 1 up to 12. Beneath the upper flange 15 of the scale at a suitable point I provide an elongated member in the form of a guide rod or bar 16 which extends longitudinally with the scale or bar 10, and has its ends attached to the heads or ends 17 of the scale. A movable member or case 18 is guided by the bar 16 along scale 10 by means of sleeves 19 with large unthreaded openings through which the bar 16 passes loosely, and the case normally hangs down from this bar (see Fig. 3). These sleeves 19 are most conveniently formed as lugs extending upwardly from the upper wall 20 of the case.

The case carries a plurality of tabulated members which are in the form of webs 21, each web being controlled by two corresponding spools or rollers 22 and 23. As illustrated, there are four pairs or couples of these rollers. One end of the web corresponding to each pair of rollers is attached to and wrapped or coiled about one of the rollers in one direction and the other end is attached and wrapped around the other roller in an opposite direction. When the machine is in operation the web passes from one of these rollers to the other, namely, from each roller 22 to its corresponding roller 23.

It will be noted that the webs 21 are carried in coils on the rollers, and by reason of this fact I am enabled to condense a considerable length of web sufficiently to enable it to be carried in the case, although the case is relatively small.

In order to enable the figures on the webs 21 to be seen through the forward wall 24 of the case, I provide the case with a plurality of windows 25, and about one-half of the opening of each of these windows is provided with a scale 26 bearing numbers. These numbers on the scale 26 indicate the price of the goods of a units measure, for example, the price in cents per yard, or per pound; whereas, the numbers 1 to 12 on the scale 10 indicate the number of yards or pounds purchased. The scales 26 have horizontal divisions and numbers indicating slight increases in price. In the illustration in the left hand table these numbers are indicated as commencing at 5¢ and increasing gradually up to 18¢, but, of course, they may start with any other amount, for example, 2¢ or 3¢.

I provide means actuated by the bar 16 to drive these rollers and for moving the webs. The rollers 22 are not directly driven but are rotated by the tension in the webs 21, as they are wrapped up or coiled upon the rollers 23. In other words, I drive positively the alternate rollers of the set. This is accomplished by employing a wheel 27 which rolls along on the bar 16, the effect being that of a rack and pinion. In order to get this effect the rod 16 is in the form of a screw and the wheel 27 has teeth which mesh with the threads of the screw so that as the case is moved along the screw will rotate the wheel 27 as a rack rotates a pinion. The wheel 27 is rigid on a small shaft 28 carrying a bevel gear 29 which meshes with and rotates another bevel gear 30, which is rigidly attached to a master spindle or shaft 34ª of one of the rollers 23. This rotates the rollers in the direction indicated by the arrow in Fig. 4 and wraps up the web. A rotary movement in the same direction is transmitted to all the rollers 23 through the medium of the gear wheels 32, which are rigid with the shafts 34 of the other rollers 23. The rollers 23 are tight on their shafts. The motion is transmitted between these gears 32 by means of idle gears 33, which are loose on the shafts 36, 36 of the rollers 22.

In order to rewind the webs upon the rolls 22, and also to give the effect of a resistance and maintain tension in the webs, I provide the rollers 22 with coiled springs 35. The shafts 36 of the rollers 22 are rigid with their rollers. One end 37 of each spring is secured to the roller's shaft while the other end 38 is secured in a removable but tight head 39 carried by the roller. That is, the heads 39 are loose on the shaft but tightly fixed to the rollers 22. Now, when the webs are drawn off from the rollers 22 they are maintained in tension by the springs and when the rollers 23 rotate in the reverse direction, the spring will take up all the slack web and maintain tension in the webs in the same manner as when the rollers are moving in the other direction.

I provide a pointer 40 which moves along with the case and indicates the position of the case on the scale 10. In order to do this the pointer has an indicating part 41 which has a notch 42 through which the divisions and number on the scale 10 can be read. The figures on the webs 21 are placed in alinement with the numbers on the scales 26, and are functions of corresponding numbers of the scales 10 and 26, that is, they are multiplicands of these numbers. Now, when the case is moved to a certain point on the scale 10, the charge for the goods will be indicated on one of the scales 26, for example, if the notch 42 stands at the number 2 on the scale 10, then the figure on each web, as seen through the windows 25, will be double the figure alining with it on the scale 26. In order to mount the pointer 40 so that it will slide freely with the case in either direction, I provide the pointer with sleeves 43 which loosely encircle the screw and abut against the ends of the sleeves 19. The indicating part 41 of the pointer projects a considerable distance over the edge of the flange 15 so that the pointer will hold itself up in position, and be guided by the edge of the flange when the machine is in operation.

As the case 18 normally hangs down, (see Fig. 3) it is normally out of the way of the salesman in moving about behind the counter. When it is desired to compute the charge for a quantity of goods being sold, the salesman simply pushes the case 18 along the scale 10 to the proper point and then swings the case 18 upwardly into a substantially horizontal position, so that the figures in the windows 25 will be visible from above as are the numbers on the scale 10. This enables all of the numbers and figures to be read simultaneously from the same point.

The arrangement of the parts at the windows 25 is clearly illustrated in Fig. 5, which should be examined in conjunction with Fig. 4. The scales 26 are preferably formed of a thin plate 26ª composed of a thin metal plate 26ᵇ and a transparent film or plate 26ᶜ which protects the interior of the case from dust, but enables the numbers on the scales 26 and webs 21 to be readily seen.

As there would be a tendency to produce wear on V pointed threads if employed on the screw 16, I prefer to employ a thread having a rounded peak 46 and a similar rounded root 47. (See Fig. 6.)

Of course, the range of the machine depends merely upon the capacity of the webs and upon the number and length of the windows 25 employed, and the size of the divisions on the scales 26. In placing the numbers on the scale 26, each scale at the right should begin at the point where the next scale to the left leaves off. In this way the machine can be made to give continuous calculations from the lowest limit to the highest limit of the capacity of the machine.

The mode of operation of the machine is briefly as follows: The salesman desiring to compute the charge for a given number of units or fractions thereof, as indicated on the scale 10, moves the device along the scale until the notch 42 comes opposite the number indicating the quantity to be sold. He then raises the case 18 to a substantially horizontal position (see Fig. 7) and looks down upon it. He then finds with his eye, that point on one of the scales 26 corresponding with the price per unit, and opposite this point he reads on the web through the window the value of the goods. When moving the case along the scale 10 the screw 16 rotates the wheel or pinion 27, and the rotary motion which is imparted through the bevel gears 29 and 30 to the driven rollers 23 will draw the webs 21 from the other rollers 22.

For convenience, in assembling the parts the forward wall 24 of the case is formed into a cover plate with curved ends or edges 48 which abut against corresponding edges 49 on the rear wall of the case. The parts are preferably put in the case from the lower end and are followed by the bottom plate 50. In order to give the machine a finished appearance the ends of the shafts 31, 34 and 36 should be hidden by means of a bottom face plate 51.

One of the webs 21 carries at its upper edge a series of numbers such as the number 2 indicated at 21$^a$, which are preferably printed in red ink, or otherwise distinguished from the other numbers on the webs. These numbers at 21$^a$ are placed so that in any position of the case 18 they indicate the same as the indicated reading at the notch 42; for example, if the notch 42 stands at the number 2 on the scale 10 then the number 2 will appear at the point 21$^a$; if notch 42 is at 2½ on the scale, then the number at 21$^a$ would be 2½, etc. These red letter numbers at 21$^a$ are intended to operate as a check to show whether the parts of the mechanism are properly adjusted so that the indicated calculations will read correctly. If desired these red checking numbers may be employed on all the webs, but this is not essential if the webs are properly secured to their rollers.

The scale 10 may have any number of fractional divisions. I have simply shown half and quarter divisions but more divisions may be used if desired.

In order to prevent forming a corner which might harm the salesman if struck by him, the ends of the scale 10 are provided with rounded end faces 31.

I prefer to use a screw 16 instead of a rack for imparting movement to the tabulated webs in the case 18 for several reasons; for example, such a screw is an article usually carried in stock and it is much more economical to employ than a rack, the teeth of which would have to be specially cut. Furthermore, by employing a screw a slight rotation of the screw on its axis in one direction or the other will operate as a means for effecting an accurate adjustment of the tabulated webs, so as to enable them to coöperate accurately with the scale 10. And the screw performs its function of a rack substantially as well as a rack.

It is understood that the embodiment of the invention set forth herein is only one of the many embodiments my invention may take, and I do not wish to be limited in the practice of my invention nor my claims to the particular embodiment set forth.

What I claim is:—

1. In a machine of the class described, a relatively fixed scale having divisions with numbers, a movable member bearing a second scale with numbers, and mounted to move longitudinally of said first named scale, a tabulated member carried by said movable member and bearing figures which are functions of the first and second named numbers, said figures being placed in alinement with corresponding numbers of said second named scale, and means for driving said tabulated member when said movable member moves along said fixed scale.

2. In a machine of the class described, a relatively fixed scale having divisions with numbers, a movable member bearing a second scale with numbers, and mounted to move longitudinally of said first named scale, a tabulated member carried by said movable member and bearing figures which are functions of the first and second named numbers, said figures being placed in alinement with corresponding numbers of said second named scale, a wheel carried by said movable member for driving said tabulated member, and an elongated member associated with said fixed scale for rotating said wheel.

3. In a machine of the class described, the combination of a relatively fixed scale having divisions with numbers, an elongated member associated with said fixed scale, a case attached to said elongated member, and mounted to slide along the same, a pointer constructed to move with said case and coöperating with the said fixed scale, a scale bearing numbers carried by said case, a tabulated member movably mounted within said case having figures alining with the numbers of the second named scale, said figures being functions of the numbers of said fixed scale and second named scale, and means moving with said case for driving said tabulated member.

4. In a machine of the class described, the combination of a relatively fixed scale constructed to be attached to a substantially horizontal support, and having numbers adapted to be read from above, an elongated member extending longitudinally with said scale, a case normally depending below said scale, a tabulated member movably mounted within said case and visible at the forward side thereof, a scale carried on the forward side of said case and bearing numbers, said tabulated member having figures placed to aline with said last named numbers, means for driving said tabulated member when said case is moved along said elongated member, said case having a connection with said elongated member permitting said case to be swung up into a substantially horizontal position to enable the figures on said tabulated member to be read from above simultaneously with the numbers on said fixed scale.

5. In a machine of the class described, the combination of a relatively fixed scale constructed to be attached to a substantially horizontal support, and having numbers adapted to be read from above, a bar extending longitudinally with said scale, a case normally hanging from said bar, a tabulated member movably mounted within said case and visible at the forward side thereof, means for driving said tabulated member when said case is moved along said bar, said parts constructed to permit said case to be swung up into a substantially horizontal position to enable the figures on said tabulated member to be read from above simultaneously with the numbers on said fixed scale.

6. In a machine of the class described, the combination of a scale constructed to be attached to a horizontal support, and having numbers adapted to be read from above, a case normally lying below said scale and movable longitudinally of said scale, calculating mechanism carried by said case the indicating numbers whereof are visible at the forward side of said case, means for driving said calculating mechanism when said case is moved along said scale, said case being supported so as to permit the same to be swung up into a substantially horizontal position to enable the indicating numbers of said calculating mechanism to be read simultaneously with the numbers on said fixed scale.

7. In a machine of the class described, the combination of a scale in the form of a bar constructed to be attached to a support, the upper face of said bar having divisions and numbers, a second bar attached at its ends to said scale and extending longitudinally therewith, a case normally hanging from said second named bar, a tabulated member movable within said case and visible at the forward side thereof, a wheel carried by said case and meshing with said second named bar to drive said tabulated member when said case is moved longitudinally along said bar, and a numbered scale carried by said case, said tabulated member having figures alining with the numbers of said last named scale, and indicating functions of the numbers of both of said scales, said case mounted on said second bar so as to be swung up into a substantially horizontal position and thereby enable the numbers on said first named scale and said tabulated member to be read simultaneously.

8. In a machine of the class described, the combination of an angle bar constructed to be attached to a support with the upper flange of said bar in a substantially horizontal plane, a second bar in the form of a screw attached at its ends to said first named bar and extending longitudinally therewith, a case normally hanging from said screw, a tabulated member movable within said case and visible at the forward side thereof, a wheel carried by said case meshing with the thread of said screw to drive said tabulated member when said case is moved longitudinally along said screw, and a numbered scale carried by said case, said tabulated member having figures alining with the numbers of said last named scale and indicating functions of the numbers of both of the said scales, said case having sleeves to slide and pivot upon said screw to enable said case to be swung up into a substantially horizontal position, and thereby enable the numbers on said first named scale and on said case to be read simultaneously.

9. In a machine of the class described, the combination of a scale constructed to be attached to a support, the upper face of said scale having divisions and numbers, a bar extending longitudinally with said scale, a case having sleeves to slide on said bar, a pointer also having a sleeve mounted on said bar and constructed to be moved in either direction by said case, said pointer having an indicating part adjacent to the divisions of said scale, a numbered scale carried by said case, a tabulated member having figures coöperating with said last named scale and indicating functions of the numbers of both of said scales, and means for driving said tabulated member when said case is moved longitudinally of said first named scale, the said sleeves of said case enabling said case to be swung up into a substantially horizontal position, and thereby enable the numbers on said case to be read simultaneously with the numbers on said first named scale.

10. In a machine of the class described, a relatively fixed scale having divisions with numbers, a case movable along said scale and carrying fixed scales, and a tabulated member within said case actuated by a movement of the said case along said scale and bearing numbers which are functions of said first named scale and coöperating with said second named scale.

11. In a machine of the class described, the combination of a relatively fixed scale having divisions with numbers, a case movable along said scale and carrying a fixed scale, a tabulated member within said case, bearing numbers which are functions of said first named scale and coöperating with said second named scale, mechanism for actuating said tabulated member, and means extending longitudinally with said scale for actuating said last named mechanism by a movement of the said case along said scale.

In testimony whereof, I have hereunto set my hand.

WALTER E. HOSCH.